(12) United States Patent
Cole (10) Patent No.: US 8,573,509 B2
(45) Date of Patent: Nov. 5, 2013

(54) TAP DEVICE FOR CONNECTION TO A SPRINKLER SYSTEM

(76) Inventor: David L. Cole, Boca Raton, FL (US)

( * ) Notice: Subject to any disclaimer, the term of this patent is extended or adjusted under 35 U.S.C. 154(b) by 548 days.

(21) Appl. No.: 12/455,420

(22) Filed: Jun. 2, 2009

(65) Prior Publication Data

US 2010/0024899 A1 Feb. 4, 2010

Related U.S. Application Data

(63) Continuation-in-part of application No. 12/220,953, filed on Jul. 29, 2008, now abandoned.

(51) Int. Cl.
*A62C 31/22* (2006.01)

(52) U.S. Cl.
USPC ........... 239/276; 239/203; 239/266; 239/268; 239/269

(58) Field of Classification Search
USPC ......... 239/203, 207, 276, 266, 268, 269, 273, 239/275, 285; 285/320
See application file for complete search history.

(56) References Cited

U.S. PATENT DOCUMENTS

| | | | | |
|---|---|---|---|---|
| 2,011,320 A * | 8/1935 | Keys | | 239/262 |
| 2,634,163 A * | 4/1953 | Double | | 239/520 |
| 2,935,266 A * | 5/1960 | Coleondro et al. | | 239/456 |
| 4,848,667 A * | 7/1989 | Dyck | | 239/446 |
| 5,368,229 A * | 11/1994 | Hayes et al. | | 239/69 |
| 5,480,336 A * | 1/1996 | Blanchard | | 446/89 |
| 5,947,386 A * | 9/1999 | Dick et al. | | 239/201 |
| 6,000,632 A * | 12/1999 | Wallace | | 239/204 |
| 6,390,391 B1 * | 5/2002 | Ulin | | 239/548 |
| 6,601,779 B1 * | 8/2003 | Heren et al. | | 239/251 |
| 2003/0168523 A1 * | 9/2003 | Lin | | 239/251 |
| 2007/0040044 A1 * | 2/2007 | Lavacot | | 239/207 |

* cited by examiner

Primary Examiner — Len Tran
Assistant Examiner — Trevor E McGraw
(74) Attorney, Agent, or Firm — Robert M. Downey, P.A.

(57) ABSTRACT

A sprinkler tap connects optionally to either a fitting of underground piping or an existing sprinkler head of an automatic sprinkler system and includes a generally T-shaped body having a fluid flow passage extending between an open bottom end and a first output port at a top end. A second output port communicates with the fluid flow passage between the bottom end and the first output port. The first output port is adapted for receiving either a male or female sprinkler head nozzle or, alternatively, a plug. A quick connect fitting on the second output port allows for easy connection and disconnection of a hose. The opposite end of the hose may be attached to a portable sprinkler device, a hand held spray nozzle or other water dispensing device. The quick connect fitting has an internal stop valve that closes when the hose is disconnected from the device, thereby preventing wasteful discharge of water from the second output port.

3 Claims, 6 Drawing Sheets

TAP DEVICE FOR CONNECTION TO A SPRINKLER SYSTEM

This application is a Continuation-in-Part of U.S. patent application Ser. No. 12/220,953 filed on Jul. 29, 2008 now abandoned.

BACKGROUND OF THE INVENTION

1. Field of the Invention

The invention relates to a device for tapping a sprinkler system and, more particularly, to a sprinkler tap for connection to an in-ground sprinkler system to allow for temporary connection of a garden hose fitted to a portable sprinkler, spray nozzle or other device.

2. Discussion of the Related Art

Automatic sprinkler systems for irrigating lawns and shrubs are well known and typically comprise a main diverter valve connected to both a water supply source and an arrangement of underground PVC pipes that lead to one or more zones. Each zone is fitted with a number of sprinkler heads that are strategically positioned throughout the zone in an effort to provide water to an entire area of grass and/or plants, trees and shrubs within the zone. The sprinkler heads are fitted to either in-ground fittings that pop up and spray water in a desired pattern when the zone is pressurized, or on the top end of a riser pipe for spraying water over the tops of plants and shrubs. An automatic timer control operates the main diverter valve and is set to sequentially activate each zone during a timed cycle of operation.

While automatic sprinkler systems are highly effective for maintaining proper irrigation of lawns and shrubs without excess waste of water, it is not uncommon to encounter insufficient watering in one or more areas of a zone. If this is a permanent, on-going problem, the best solution may be to either add more sprinkler heads to the zone or move existing heads so that all areas are properly irrigated. However, adding and/or moving sprinkler heads is labor intensive and may require installation of additional underground pipes to reach the desired areas. This can be a relatively expensive job which usually requires hiring a professional sprinkler installation service.

Often, the need to provide additional watering to particular areas in a sprinkler zone is temporary and, accordingly, the labor and cost of extending underground piping is not justified. For instance, newly planted grass or flowers may required heavier watering than normal until the roots extend and take hold in the soil. Also, during a drought, when the number of watering days may be restricted, certain areas of a lawn or garden may not receive adequate water from the permanent sprinkler heads. This is particularly a problem in areas that encounter little to no shade during the summer months.

Presently, supplemental watering of these temporary trouble areas is accomplished by attaching a garden hose to a hose bib (i.e., a spigot) and a portable sprinkler device that is placed at the desired area. This approach requires the water to be turned on and off manually at the hose bib. Moreover, the connection point for the hose is not always conveniently located, thereby requiring multiple lengths to be connected in order to reach the desired area. The need to manually operate the water spigot tends to waste considerable amounts of water, as the sprinkler is often left running longer than necessary. Additionally, the unsightly appearance of a garden hose extending across lawns, patios and driveways, as well as the need to mow the lawn, requires frequent removal and replacement of the extended length of garden hose and the portable sprinkler device.

Accordingly, there remains a need for a simple and easy to install tap device that attaches to an underground sprinkler system to allow for temporary connection and select placement of a portable sprinkler or other device to effectively irrigate areas of a lawn, garden or shrubs that require additional watering. More particularly, there remains a need for a sprinkler tap device that utilizes the timed zone control activation features of an existing underground sprinkler system to allow for additional irrigation of particular areas of a lawn or garden without the need for manual activation, thereby preventing excess waste of water and eliminating the inconvenience of extended lengths of garden hose.

SUMMARY OF THE INVENTION

The present invention is directed to a sprinkler tap device that connects optionally to either a fitting of underground piping or an existing sprinkler head of an automatic sprinkler system. The sprinkler tap device includes a generally T-shaped body with a fluid flow passage extending between an open bottom end and a first output port at a top end of the tubular body. A second output port extending from the T-shaped body communicates with the fluid flow passage between the bottom end and the first output port at the top end. The first output port is adapted for receiving either a male or female sprinkler nozzle. Alternatively, the first output port can be capped off with a plug fitting.

The second output port is structured for attachment of a fluid conduit, such as a flexible garden hose. In a preferred embodiment, the second output port is provided with a quick connect fitting that has a female receptacle and an internal stop valve. A corresponding male component attaches to the end of the garden hose and is adapted for water tight connection within the female receptacle of the quick connect fitting. The opposite end of the garden hose may be attached to a portable sprinkler device, a hand held spray nozzle or other water dispensing device. When the male component on the end of the garden hose is disconnected from the quick connect fitting, the internal stop valve operates to a normally closed position, thereby preventing wasteful discharge of water from the second output port when the particular zone of the sprinkler system is activated.

The sprinkler tap device of the present invention can be easily installed to an existing automatic sprinkler system by first removing a sprinkler head fixture at the desired location within any zone of the system. The sprinkler tap device can then be attached to the threaded fitting of the pipe system from which the sprinkler head fixture was removed. This is done by attaching an extension tube to the open bottom end of the tap device with the use of a specific adapter. An opposite lower end of the extension tube threadably attaches to the underground fitting. In instances where spring loaded pop-up type sprinklers with removable spray pattern nozzles are used, the device can be attached directly to the existing head. This is done by removing the nozzle and, with the use of an adapter, attaching the tap device to the pop-up tube of the sprinkler head. In either instance, the sprinkler tap device can be easily moved from one location to another in any zone of the automatic sprinkler system.

BRIEF DESCRIPTION OF THE DRAWINGS

For a fuller understanding of the nature of the present invention, reference should be made to the following detailed description taken in conjunction with the accompanying drawings in which:

FIG. 3 is an elevational view showing the sprinkler tap of the present invention connected to an underground irrigation system with a sprinkler

Like reference numerals refer to like parts throughout the several views of the drawings.

DETAILED DESCRIPTION OF THE PREFERRED EMBODIMENT

The sprinkler tap device of the present invention is shown throughout the several views of the drawings and is generally indicated as 10.

Figure 1:
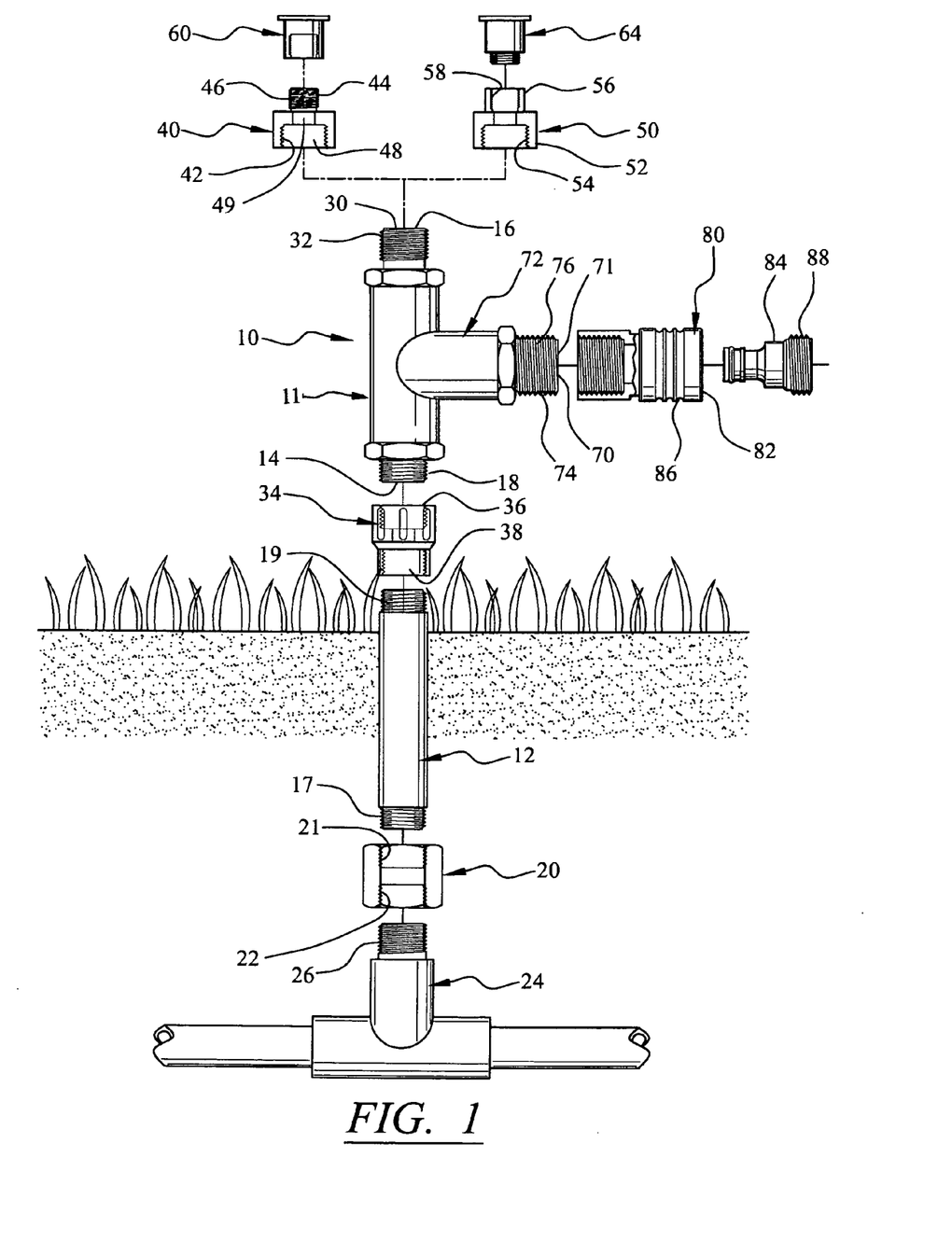
FIG. 1 is an exploded elevational view illustrating the sprinkler tap of the present invention for connection to an underground irrigation system and showing alternative attachment of either a male or female threaded sprinkler nozzle to a first output port on a top end and connection of a garden hose to a quick connect fitting at a second output port of the device.

Referring initially to FIG. 1, the sprinkler tap device 10 includes a generally T-shaped body 11 having a bottom end 14 and a top end 16. The bottom end 14 is open and defines an input port for threaded attachment with an adapter. Specifically, the bottom end 14 is provided with threads 18 for threaded engagement with various adapters, including adapter 34 shown in FIGS. 1-4 and adapter 50 shown in FIGS. 5-6.

FIGS. 1-4 show attachment of the sprinkler tap device 10 to a PVC T-connector in the underground piping of the automatic sprinkler system. In a preferred embodiment, the sprinkler tap device 10 is interconnected to the underground piping T-connector fitting with the use of an adapter 34 and a tube extension 12. Specifically, the adapter 34, includes a first opening with threads 36 adapted for threaded attachment to the threads 18 on the bottom end 14 of the body 11 of the sprinkler tap device 10. A lower end of the adapter 34 is of a slightly reduced diameter and includes interior threads 38 structured and disposed for threaded engagement with threads 19 on the top end of the tube extension 12. The bottom end of the tube extension 12 has threads 17 that engage with interior threads 21 on connector 20. The connector 20 is used for attaching the male threaded end of the tube extension 12 to the male threaded end 26 of the T-connector 24. The male threads 26 on the T-connector 24 engage with threads 22 on the inside of connector 20.

The top end 16 of the device 10 is open to define a first output port 30. Exterior threads 32 on the top end 16 allow for selective attachment of a male adapter 40 or a female adapter 50. The male adapter 40 has interior threads 42 for engagement with the exterior threads 32 of the top end of the device 10. The male adapter 40 further includes an attachment stub 44 with exterior threads 46 for threaded engagement of a female (i.e., internal threads) sprinkler nozzle 60. The male adapter 40 is open at both ends with a fluid flow passage therethrough. The lower portion 48 of the fluid flow passage of the male adapter has a larger diameter, with the upper portion 49 being of reduced diameter to allow for attachment of the female sprinkler nozzle 60.

The female adapter 50 includes a lower portion 52 with internal threads 54 for attachment to the top end 16 of the device 10. An upper portion 56 of the female adapter 50 is of a reduced diameter and includes internal threads 58 for threaded attachment of a male sprinkler nozzle 64.

The sprinkler tap device 10 further includes a second output port 70. As seen throughout the several views of the drawings, a preferred embodiment of the device includes a tubular segment 72 extending from the elongate tubular body 11 of the device 10. In a preferred embodiment, the tubular segment 72 is generally perpendicular to the longitudinal axis of the main tubular body 11. An open end 71 of the tubular segment 72 communicates with the interior fluid flow passage extending between the input port 14 at the bottom end of the device 10 and the first output port 30 at the top end 16 of the device. The open end 71 of the tubular segment 72 defines the second output port 70 for connection of an additional water dispensing device. Specifically, a distal end portion 74 of the tubular segment 72 surrounding the second output port 70 is structured for attachment of a water dispensing device. More particularly, the end of the tubular segment 72 surrounding the second output port 70 is structured for attachment of a garden hose 90 thereto. In one embodiment, the distal end portion 74 of the tubular segment 72 is provided with exterior threads 76 for threaded attachment of either a garden hose coupling 92 or a quick connect fitting 80. In another embodiment, the tubular segment 72 may be manufactured to include an integral quick connect fitting 80.

In the preferred embodiment, as shown throughout the several views of the drawings, the quick connect fitting 80 is provided on the end of the tubular segment 72 and further defines the second output port 70 of the device. The quick connect fitting 80 is provided with an internal stop valve that is normally closed to prevent outward flow of water from the second output port. A female receptacle 82 of the quick connect fitting 80 is structured for cooperative, interconnecting receipt of a male component 84. Sliding movement of an exterior collar 86 of the quick connect fitting 80, from a normally relaxed position, allows for insertion and removal of the male component 84 within the female receptacle 82. The male component 84 of the quick connect fitting 80 is provided with threads 88 for attachment to a coupling 92 on the end of a garden hose 90. When the male component 84 is received and interlocked within the female receptacle 82 of the quick connect fitting, the internal stop valve is opened, thereby permitting fluid flow of water from within the device and out through the second output port 70, through the male component 84 and into the attached garden hose 90. The opposite end of the garden hose 90 can be connected to a portable sprinkler device 94, as seen in FIG. 2, or a hand held spray nozzle, as well as any other water dispensing device.

Figure 4:
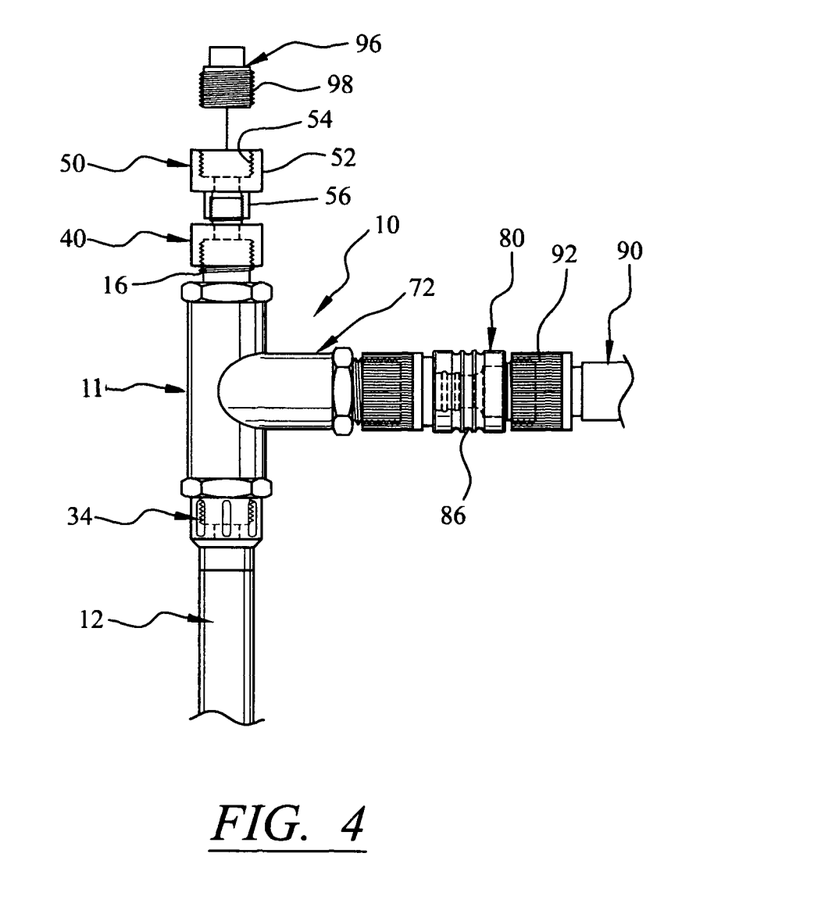
FIG. 4 is an isolated elevational view showing an arrangement of fittings on a top end of the device for receiving a plug to close a first discharge port on the top of the device.

Referring to FIG. 4, the first output port 30 can be capped off with a plug 96. In a preferred embodiment, the plug 96 is attached using both the male adapter 40 and the female adapter 50. As shown in FIG. 4, the internal threads 54 of the upper portion 56 engage with the exterior threads 46 of the male adapter 40. The plug 96 can then be fastened within the lower portion 52 of the female adapter 50 which is now facing upwardly, as seen in FIG. 4. Specifically, exterior threads 98 on the plug 96 engage with the internal threads 54 of the lower portion 52 of the female adapter 50.

Figure 2:
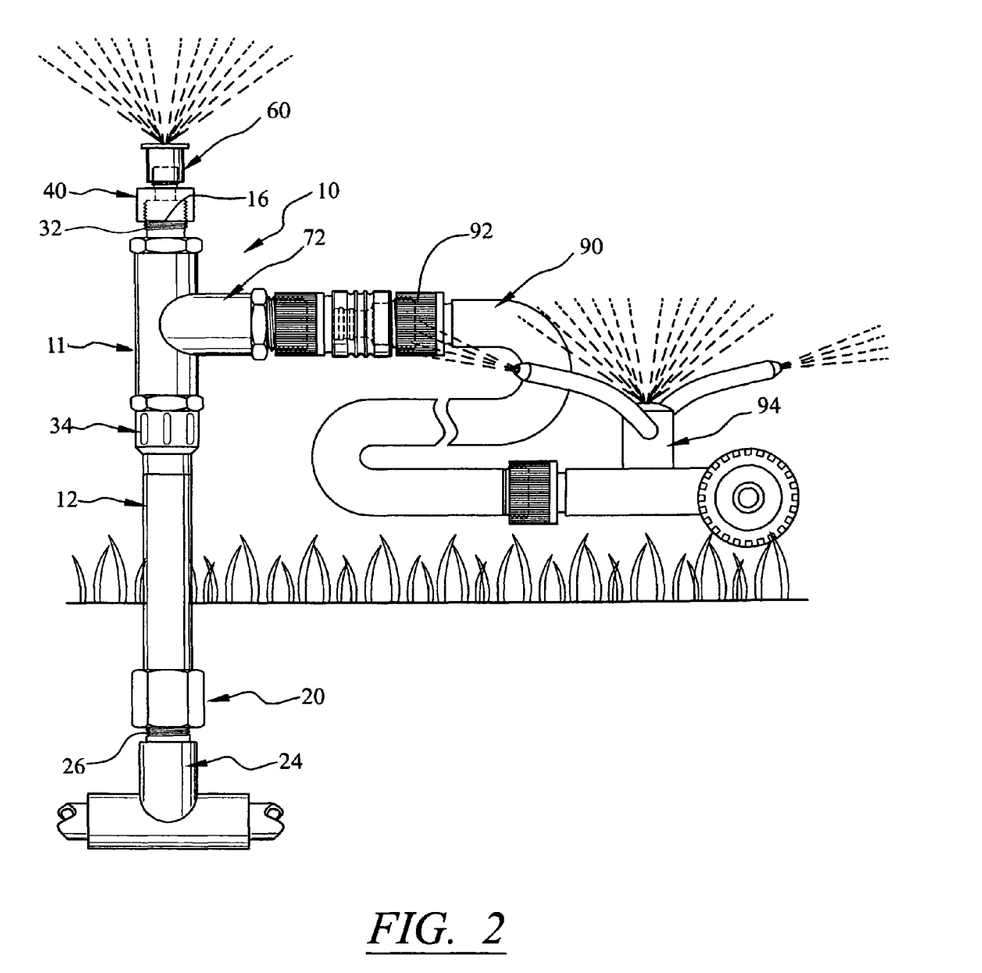
FIG. 2 is an elevational view showing the sprinkler tap of the present invention connected to an underground irrigation system with both a sprinkler nozzle on the device activated and the quick connect fitting of the device connected to a garden hose and portable sprinkler.
Figure 3:
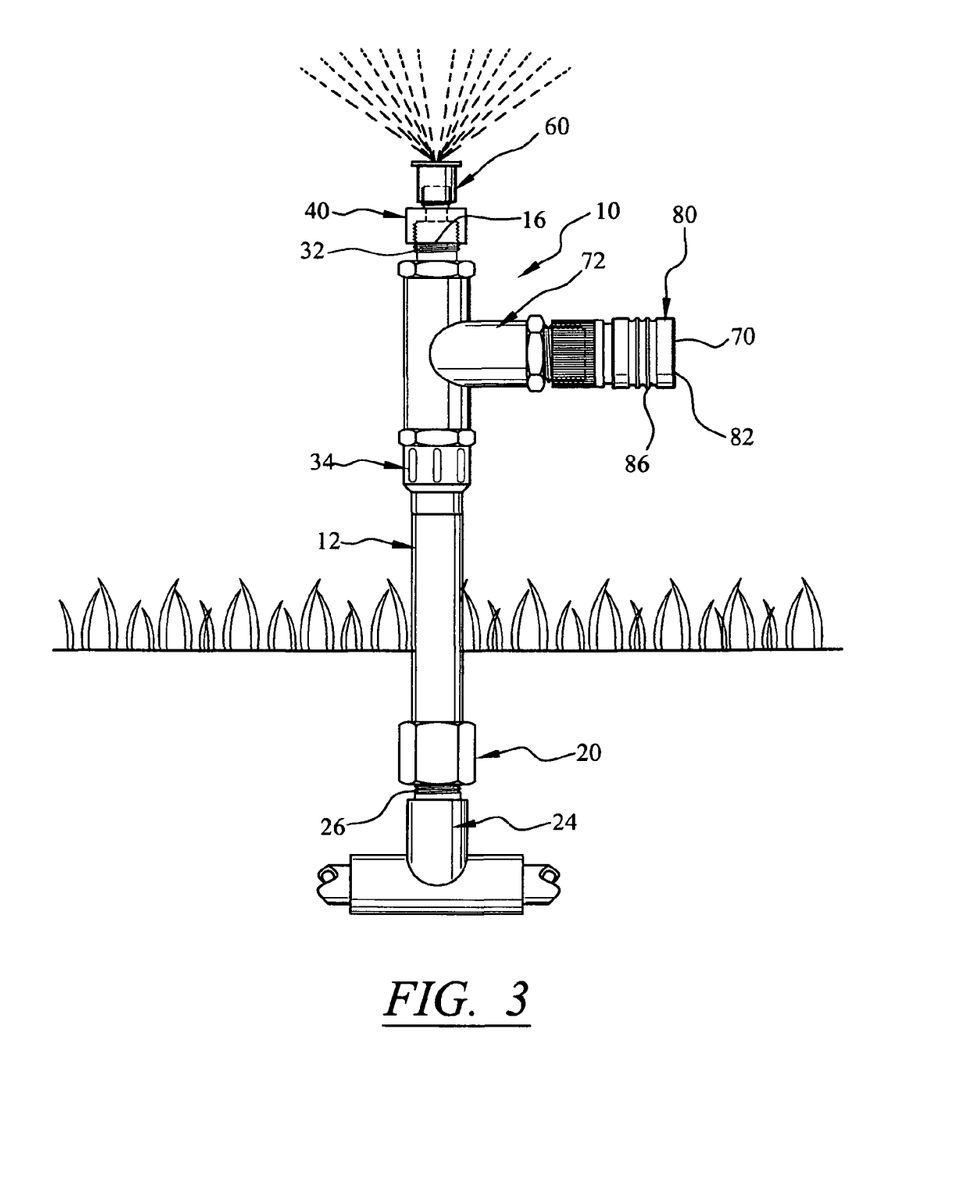
FIG. 3 is an elevational view showing the sprinkler tap of the present invention connected to an underground irrigation system with a sprinkler nozzle on the device activated and the garden hose disconnected from the quick connect fitting, thereby closing a stop valve feature in the quick connect fitting.

In use, the device 10 can be operated to dispense water from both a sprinkler nozzle attached to the first output port 30 as well as a portable sprinkler device 94 attached to the second output port 70, as shown in FIG. 2. When the garden hose 90 is disconnected and the stop valve of the quick connect fitting 80 is closed, dispensing of water is limited to the sprinkler nozzle on the top end of the device (see FIG. 3) during operation of the automatic sprinkler system. Alternatively, the first output port 30 can be capped off, using the plug 96, as seen in FIG. 4. In this instance, when the garden hose 90 is connected to the quick connect fitting 80 of the second output port 70, water is only directed out through the second output port 70 and into the hose and attached water dispensing device (e.g., a portable sprinkler device) during operation of the automatic sprinkler system in the particular zone. If the garden hose is removed from the quick connect fitting 80 and the plug 96 is fastened to cap off the first output port, no water is dispensed from the device during activation of the sprinkler system.

Figure 5:
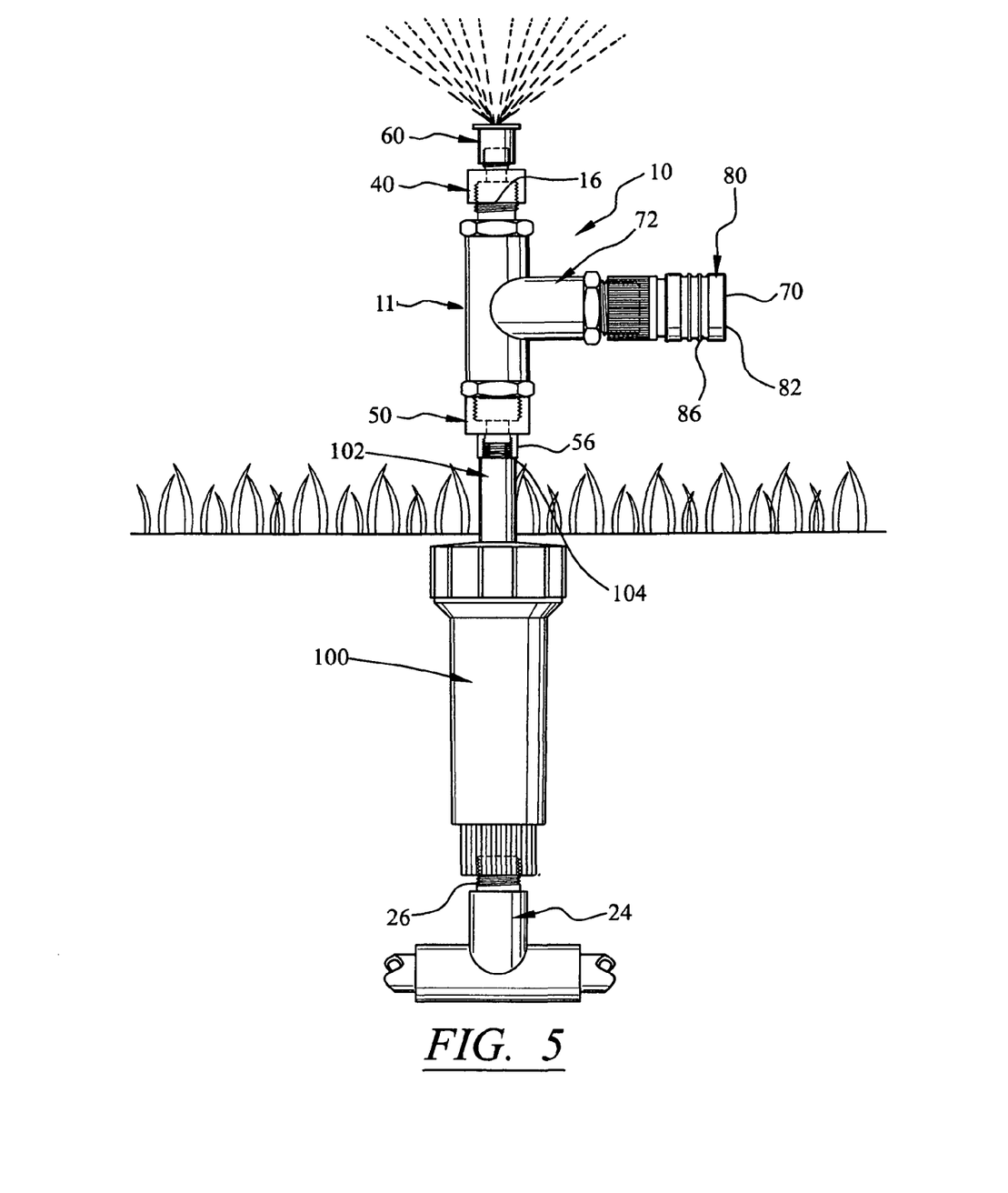
FIG. 5 is an elevational view showing the sprinkler tap of the present invention connected to an existing sprinkler head of an automatic sprinkler system.
Figure 6:
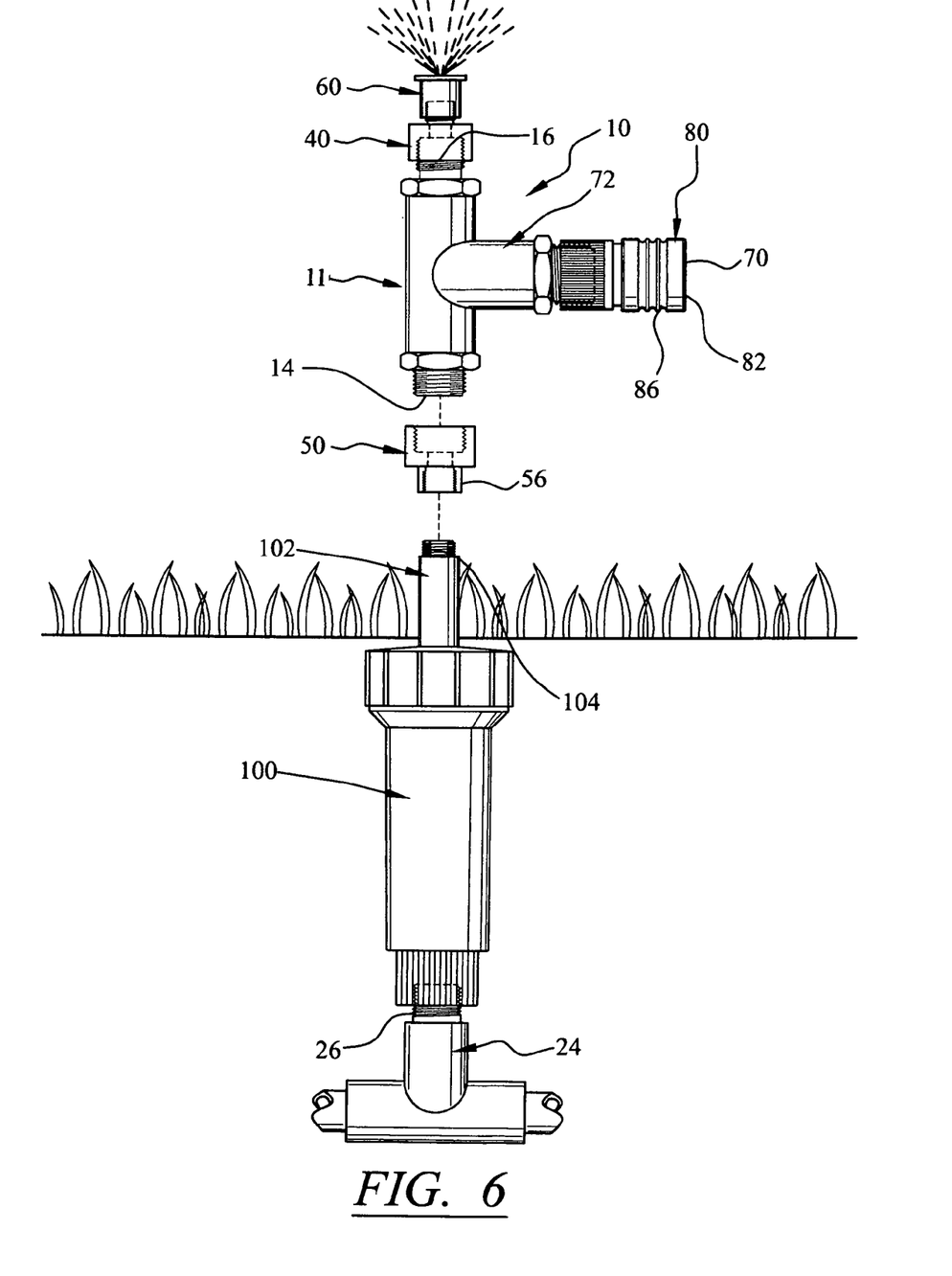
FIG. 6 is an exploded view of FIG. 5 showing the sprinkler tap separated from an adapter and the threaded top end of a pop-up tube of the automatic sprinkler system.

FIGS. 5 and 6 illustrate attachment of the sprinkler tap device 10 to an existing sprinkler head 100 of the automatic sprinkler system. This is an alternative means of attachment rather than having to attach the device 10 to the underground fitting 24. In this instance, as shown in FIGS. 5 and 6, the sprinkler tap device 10 attaches to the threaded top end 104 of a pop-up tube of the sprinkler head 100. More specifically, an existing sprinkler nozzle 60 is removed from the threaded top end 104 of the pop-up tube 102 and adapter 50 is then threadably fastened to the threads 104. The adapter 50 is also threadably fastened to the threads 18 on the bottom end of the main body 11 of the device 10 in order to complete attachment of the device 10 to the sprinkler head 100, as shown in FIG. 5. The sprinkler nozzle 60 can then be attached to the top end of the device 10 with the use of adapter 40. Alternatively, the top end can be capped off if desired. A hose can be attached to the quick connect fitting 80 in the manner described above in connection with FIGS. 1-4.

While the present invention has been shown and described in accordance with a preferred and practical embodiment thereof, it is recognized that departures from the instant disclosure are fully contemplated within the spirit and scope of the invention.

What is claimed is:

1. A sprinkler tap device for connecting a garden hose to a pop-up sprinkler head in an automatic sprinkler system, wherein the garden hose has a coupling on one end, said sprinkler tap device comprising:
   a main body having a bottom end with an input port, an opposite top end with a first output port, a second output port between said input port and said first output port, and a fluid flow passage extending between and disposed in fluid flow communication with said input port, said first output port and said second output port;
   said open bottom end being structured for removable attachment to the pop-up sprinkler head with said input port disposed in fluid flow communication with the pop-up sprinkler head;
   screw threads on said top end and adjacent to said first output port, and said screw threads on said top end being structured and disposed for selectively and removably attaching a sprinkler nozzle or a plug to said top end in fluid communication with said first output port;
   exterior screw threads adjacent to said second output port for threaded engagement with the coupling on the garden hose, and thereby allowing removable attachment of the garden hose to the sprinkler tap device in fluid flow communication with said second output port;
   a first adapter removably and selectively attachable to said top end of the sprinkler tap device and said first adapter including a first arrangement of screw threads for engagement with said screw threads on said top end of said main body of the sprinkler tap device, and said first adapter further including an attachment stub with exterior male threads for cooperating screw-on threaded attachment of a female threaded sprinkler nozzle thereto and in fluid communication with said first output port;
   a second adapter removably and selectively attachable to said top end of the sprinkler tap device and said second adapter including a first arrangement of screw threads for engagement with said screw threads on said top end of said main body of the sprinkler tap device, and said second adapter further including an attachment stub with interior female threads for cooperating screw-on threaded attachment of a male threaded sprinkler nozzle thereto and in fluid communication with said first output port; and
   a third adapter structured and disposed for removable attachment to said bottom end of said main body of the sprinkler tap device and the pop-up sprinkler head to thereby attach the sprinkler tap device to the pop-up sprinkler head with said first input port, said fluid flow passage, said first output port and said second output port disposed in fluid flow communication with the pop-up sprinkler head.

2. A sprinkler tap device for connecting a garden hose to a pop-up sprinkler head in an automatic sprinkler system, said sprinkler tap device comprising:
   a main body having a bottom end with an input port, an opposite top end with a first output port, a second output port between said input port and said first output port, and a fluid flow passage extending between and disposed in fluid flow communication with said input port, said first output port and said second output port;
   said open bottom end including screw threads for allowing removable attachment of said main body to the pop-up sprinkler head so that said input port is disposed in fluid flow communication with the pop-up sprinkler head;
   screw threads on said top end and adjacent to said first output port, and said screw threads on said top end being structured and disposed for selectively and removably attaching a sprinkler nozzle or a plug to said top end in fluid communication with said first output port;
   exterior screw threads adjacent to said second output port for removably attaching the garden hose thereto, and thereby attaching the garden hose to the sprinkler tap device and in fluid flow communication with the pop-up sprinkler head;
   a first adapter removably and selectively attachable to said top end of the sprinkler tap device and said first adapter including a first arrangement of screw threads for engagement with said screw threads on said top end of said main body of the sprinkler tap device, and said first adapter further including an attachment stub with exterior male threads for cooperating screw-on threaded attachment of a female threaded sprinkler nozzle thereto and in fluid communication with said first output port;
   a second adapter removably and selectively attachable to said top end of the sprinkler tap device and said second adapter including a first arrangement of screw threads for engagement with said screw threads on said top end of said main body of the sprinkler tap device, and said second adapter further including an attachment stub with interior female threads for cooperating screw-on threaded attachment of a male threaded sprinkler nozzle thereto and in fluid communication with said first output port; and a third adapter structured and disposed for removable attachment to said bottom end of said main body of the sprinkler tap device and the pop-up sprinkler head to thereby attach the sprinkler tap device to the pop-up sprinkler head with said first input port, said fluid flow passage, said first output port and said second output port disposed in fluid flow communication with the pop-up sprinkler head.

3. A sprinkler tap device for connecting a garden hose to a pop-up sprinkler head in an automatic sprinkler system, said sprinkler tap device comprising:

a main body having a bottom end with an input port, an opposite top end with a first output port, a second output port between said input port and said first output port, and a fluid flow passage extending between and disposed in fluid flow communication with said input port, said first output port and said second output port;

said open bottom end including screw threads for allowing removable attachment of said main body to the pop-up sprinkler head so that said input port is disposed in fluid flow communication with the pop-up sprinkler head;

screw threads on said top end and adjacent to said first output port and said screw threads being structured and disposed for selectively and removably attaching a sprinkler nozzle or a plug to said top end in fluid communication with said first output port;

a quick connect structure at said second output port for removably attaching the garden hose thereto, and thereby attaching the garden hose to the sprinkler tap device and in fluid flow communication with the pop-up sprinkler head;

a first adapter removably and selectively attachable to said top end of the sprinkler tap device and said first adapter including a first arrangement of screw threads for engagement with said screw threads on said top end of said main body of the sprinkler tap device, and said first adapter further including an attachment stub with exterior male threads for cooperating screw-on threaded attachment of a female threaded sprinkler nozzle thereto and in fluid communication with said first output port;

a second adapter removably and selectively attachable to said top end of the sprinkler tap device and said second adapter including a first arrangement of screw threads for engagement with said screw threads on said top end of said main body of the sprinkler tap device, and said second adapter further including an attachment stub with interior female threads for cooperating screw-on threaded attachment of a male threaded sprinkler nozzle thereto and in fluid communication with said first output port; and a third adapter structured and disposed for removable attachment to said bottom end of said main body of the sprinkler tap device and the pop-up sprinkler head to thereby attach the sprinkler tap device to the pop-up sprinkler head with said first input port, said fluid flow passage, said first output port and said second output port disposed in fluid flow communication with the pop-up sprinkler head.

* * * * *